US010268467B2

(12) United States Patent
Ramanathan et al.

(10) Patent No.: US 10,268,467 B2
(45) Date of Patent: Apr. 23, 2019

(54) POLICY-DRIVEN MANAGEMENT OF APPLICATION TRAFFIC FOR PROVIDING SERVICES TO CLOUD-BASED APPLICATIONS

(71) Applicant: A10 Networks, Inc., San Jose, CA (US)

(72) Inventors: Ragavan Ramanathan, San Jose, CA (US); Alak Deb, San Jose, CA (US); Sudarshan Raghavan, Bangalore (IN); Anirudha Kamatgi, Bangalore (IN); Sridhar Srinivasan, Bangalore (IN); Girish Karthik Ramasamy, Bangalore (IN); Srinath Chandrashekhar, Bangalore (IN); Akshay Mathur, Bangalore (IN)

(73) Assignee: A10 Networks, Inc., San Jose, CA (US)

( * ) Notice: Subject to any disclaimer, the term of this patent is extended or adjusted under 35 U.S.C. 154(b) by 148 days.

(21) Appl. No.: 14/940,129

(22) Filed: Nov. 12, 2015

(65) Prior Publication Data
US 2016/0139910 A1  May 19, 2016

Related U.S. Application Data

(60) Provisional application No. 62/078,400, filed on Nov. 11, 2014.

(51) Int. Cl.
*G06F 8/65* (2018.01)
*H04L 29/08* (2006.01)
*H04L 12/24* (2006.01)

(52) U.S. Cl.
CPC ............ *G06F 8/65* (2013.01); *H04L 41/0893* (2013.01); *H04L 67/1095* (2013.01);
(Continued)

(58) Field of Classification Search
CPC ... G06F 8/65; H04L 43/0805; H04L 67/1095; H04L 67/34
(Continued)

(56) References Cited

U.S. PATENT DOCUMENTS 4,403,286 A   9/1983  Fry et al.
4,495,570 A   1/1985  Kitajima et al.
(Continued)

FOREIGN PATENT DOCUMENTS

CN   1725702 A    1/2006
CN   101094225 A  12/2007
(Continued)

OTHER PUBLICATIONS

Cardellini, et al., "Dynamic Load Balancing on Web-Server Systems", IEEE Internet Computing, 1999, vol. 3(3), pp. 28-29.
(Continued)

*Primary Examiner* — Li B. Zhen
*Assistant Examiner* — Zengpu Wei
(74) *Attorney, Agent, or Firm* — Keith Kline; The Kline Law Firm PC

(57) ABSTRACT

Policy-driven management of application traffic is provided for services to cloud-based applications. A steering policy refers to a set of rules is generated for a deployment from a current code environment to one or more replicated code environment differing in some key respect. The steering policy can guide steering decisions between the current and updated code environments. A steering server uses the steering policy to make decisions about whether to send service requests to the current code environment or the updated code environment. Feedback concerning actual steering decisions made by the steering server is received (e.g., performance metrics). The steering policy is automatically adjusted in response to the feedback.

16 Claims, 7 Drawing Sheets

(52) U.S. Cl.
CPC ............ *H04L 67/34* (2013.01); *H04L 41/046* (2013.01); *H04L 41/082* (2013.01); *H04L 41/0816* (2013.01); *H04L 41/5025* (2013.01); *H04L 41/5067* (2013.01)

(58) Field of Classification Search
USPC .......................................................... 717/170
See application file for complete search history.

(56) References Cited

U.S. PATENT DOCUMENTS

| | | |
|---|---|---|
| 4,577,272 A | 3/1986 | Ballew et al. |
| 4,720,850 A | 1/1988 | Oberlander et al. |
| 4,864,492 A | 9/1989 | Blakely-Fogel et al. |
| 4,882,699 A | 11/1989 | Evensen |
| 5,031,089 A | 7/1991 | Liu et al. |
| 5,218,676 A | 6/1993 | Ben-Ayed et al. |
| 5,293,488 A | 3/1994 | Riley et al. |
| 5,341,477 A | 8/1994 | Pitkin et al. |
| 5,432,908 A | 7/1995 | Heddes et al. |
| 5,537,542 A | 7/1996 | Eilert et al. |
| 5,563,878 A | 10/1996 | Blakeley et al. |
| 5,603,029 A | 2/1997 | Aman et al. |
| 5,675,739 A | 10/1997 | Eilert et al. |
| 5,740,371 A | 4/1998 | Wallis |
| 5,751,971 A | 5/1998 | Dobbins et al. |
| 5,754,752 A | 5/1998 | Sheh et al. |
| 5,774,660 A | 6/1998 | Brendel et al. |
| 5,774,668 A | 6/1998 | Choquier et al. |
| 5,796,936 A | 8/1998 | Watabe et al. |
| 5,812,771 A | 9/1998 | Fee et al. |
| 5,828,847 A | 10/1998 | Gehr et al. |
| 5,835,724 A | 11/1998 | Smith |
| 5,867,636 A | 2/1999 | Walker |
| 5,867,661 A | 2/1999 | Bittinger et al. |
| 5,875,296 A | 2/1999 | Shi et al. |
| 5,917,997 A | 6/1999 | Bell et al. |
| 5,918,017 A | 6/1999 | Attanasio et al. |
| 5,923,854 A | 7/1999 | Bell et al. |
| 5,931,914 A | 8/1999 | Chiu |
| 5,935,207 A | 8/1999 | Logue et al. |
| 5,935,215 A | 8/1999 | Bell et al. |
| 5,941,988 A | 8/1999 | Bhagwat et al. |
| 5,944,794 A | 8/1999 | Okamoto et al. |
| 5,946,686 A | 8/1999 | Schmuck et al. |
| 5,951,650 A | 9/1999 | Bell et al. |
| 5,951,694 A | 9/1999 | Choquier et al. |
| 6,006,264 A | 12/1999 | Colby et al. |
| 6,006,269 A | 12/1999 | Phaal |
| 6,031,978 A | 2/2000 | Cotner et al. |
| 6,041,357 A | 3/2000 | Kunzelman et al. |
| 6,076,108 A | 6/2000 | Courts et al. |
| 6,088,728 A | 7/2000 | Bellemore et al. |
| 6,098,093 A | 8/2000 | Bayeh et al. |
| 6,104,717 A | 8/2000 | Coile et al. |
| 6,119,174 A | 9/2000 | Borowsky et al. |
| 6,128,279 A | 10/2000 | O'Neil et al. |
| 6,141,759 A | 10/2000 | Braddy |
| 6,185,598 B1 | 2/2001 | Farber et al. |
| 6,223,205 B1 | 4/2001 | Harchol-Balter et al. |
| 6,223,287 B1 | 4/2001 | Douglas et al. |
| 6,247,057 B1 | 6/2001 | Barrera, III |
| 6,249,820 B1 | 6/2001 | Dobbins et al. |
| 6,252,878 B1 | 6/2001 | Locklear, Jr. et al. |
| 6,262,976 B1 | 7/2001 | McNamara |
| 6,286,039 B1 | 9/2001 | Van Horne et al. |
| 6,314,463 B1 | 11/2001 | Abbott et al. |
| 6,317,786 B1 | 11/2001 | Yamane et al. |
| 6,324,177 B1 | 11/2001 | Howes et al. |
| 6,330,560 B1 | 12/2001 | Harrison et al. |
| 6,339,423 B1 | 1/2002 | Sampson et al. |
| 6,353,614 B1 | 3/2002 | Borella et al. |
| 6,363,075 B1 | 3/2002 | Huang et al. |
| 6,363,081 B1 | 3/2002 | Gase |
| 6,374,300 B2 | 4/2002 | Masters |
| 6,374,359 B1 | 4/2002 | Shrader et al. |
| 6,381,632 B1 | 4/2002 | Lowell |
| 6,393,475 B1 | 5/2002 | Leong et al. |
| 6,397,261 B1 | 5/2002 | Eldridge et al. |
| 6,430,622 B1 | 8/2002 | Aiken, Jr. et al. |
| 6,445,704 B1 | 9/2002 | Howes et al. |
| 6,446,225 B1 | 9/2002 | Robsman et al. |
| 6,490,682 B2 | 12/2002 | Vanstone et al. |
| 6,496,866 B2 | 12/2002 | Attanasio et al. |
| 6,510,464 B1 | 1/2003 | Grantges, Jr. et al. |
| 6,515,988 B1 | 2/2003 | Eldridge et al. |
| 6,542,926 B2 | 4/2003 | Zalewski et al. |
| 6,564,215 B1 | 5/2003 | Hsiao et al. |
| 6,567,857 B1 | 5/2003 | Gupta et al. |
| 6,578,066 B1 | 6/2003 | Logan et al. |
| 6,587,866 B1 | 7/2003 | Modi |
| 6,591,262 B1 | 7/2003 | MacLellan et al. |
| 6,594,268 B1 | 7/2003 | Aukia et al. |
| 6,598,167 B2 | 7/2003 | Devine et al. |
| 6,606,315 B1 | 8/2003 | Albert et al. |
| 6,609,150 B2 | 8/2003 | Lee et al. |
| 6,611,498 B1 | 8/2003 | Baker et al. |
| 6,650,641 B1 | 11/2003 | Albert et al. |
| 6,657,974 B1 | 12/2003 | Britton et al. |
| 6,697,354 B1 | 2/2004 | Borella et al. |
| 6,701,377 B2 | 3/2004 | Burmann et al. |
| 6,704,317 B1 | 3/2004 | Dobson |
| 6,711,618 B1 | 3/2004 | Danner et al. |
| 6,714,979 B1 | 3/2004 | Brandt et al. |
| 6,718,383 B1 | 4/2004 | Hebert |
| 6,742,126 B1 | 5/2004 | Mann et al. |
| 6,745,229 B1 | 6/2004 | Gobin et al. |
| 6,748,413 B1 | 6/2004 | Bournas |
| 6,760,758 B1 | 7/2004 | Lund et al. |
| 6,763,370 B1 | 7/2004 | Schmeidler et al. |
| 6,763,468 B2 | 7/2004 | Gupta et al. |
| 6,772,333 B1 | 8/2004 | Brendel |
| 6,779,017 B1 | 8/2004 | Lamberton et al. |
| 6,877,095 B1 | 4/2005 | Allen |
| 6,886,044 B1 | 4/2005 | Miles et al. |
| 6,892,307 B1 | 5/2005 | Wood et al. |
| 6,941,384 B1 | 9/2005 | Aiken, Jr. et al. |
| 6,952,728 B1 | 10/2005 | Alles et al. |
| 6,954,784 B2 | 10/2005 | Aiken, Jr. et al. |
| 6,963,917 B1 | 11/2005 | Callis et al. |
| 6,965,930 B1 | 11/2005 | Arrowood et al. |
| 6,996,617 B1 | 2/2006 | Aiken, Jr. et al. |
| 6,996,631 B1 | 2/2006 | Aiken, Jr. et al. |
| 7,058,600 B1 | 6/2006 | Combar et al. |
| 7,058,789 B2 | 6/2006 | Henderson et al. |
| 7,120,697 B2 | 10/2006 | Aiken, Jr. et al. |
| 7,188,181 B1 | 3/2007 | Squier et al. |
| 7,225,249 B1 | 5/2007 | Barry et al. |
| 7,430,611 B2 | 9/2008 | Aiken, Jr. et al. |
| 7,463,648 B1 | 12/2008 | Eppstein et al. |
| 7,509,369 B1 | 3/2009 | Tormasov |
| 7,703,102 B1 | 4/2010 | Eppstein et al. |
| 7,792,113 B1 | 9/2010 | Foschiano et al. |
| 7,948,952 B2 | 5/2011 | Hurtta et al. |
| 7,970,934 B1 | 6/2011 | Patel |
| 7,991,859 B1 | 8/2011 | Miller et al. |
| 8,019,870 B1 | 9/2011 | Eppstein et al. |
| 8,032,634 B1 | 10/2011 | Eppstein et al. |
| 8,179,809 B1 | 5/2012 | Eppstein et al. |
| 8,191,106 B2 | 5/2012 | Choyi et al. |
| 8,224,971 B1 | 7/2012 | Miller et al. |
| 8,234,650 B1 | 7/2012 | Eppstein et al. |
| 8,239,445 B1 | 8/2012 | Gage et al. |
| 8,255,644 B2 | 8/2012 | Sonnier et al. |
| 8,296,434 B1 | 10/2012 | Miller et al. |
| 8,312,507 B2 | 11/2012 | Chen et al. |
| 8,543,644 B2 | 9/2013 | Gage et al. |
| 8,584,199 B1 | 11/2013 | Chen et al. |
| 8,595,791 B1 | 11/2013 | Chen et al. |
| 8,813,180 B1 | 8/2014 | Chen et al. |
| 8,826,372 B1 | 9/2014 | Chen et al. |
| 8,885,463 B1 | 11/2014 | Medved et al. |
| 9,118,618 B2 | 8/2015 | Davis |
| 9,118,620 B1 | 8/2015 | Davis |

(56) References Cited

U.S. PATENT DOCUMENTS

| | | |
|---|---|---|
| 9,219,751 B1 | 12/2015 | Chen et al. |
| 9,253,152 B1 | 2/2016 | Chen et al. |
| 9,270,705 B1 | 2/2016 | Chen et al. |
| 9,338,225 B2 | 5/2016 | Jalan et al. |
| 9,350,744 B2 | 5/2016 | Chen et al. |
| 9,356,910 B2 | 5/2016 | Chen et al. |
| 9,497,201 B2 | 11/2016 | Chen et al. |
| 9,544,364 B2 | 1/2017 | Jalan et al. |
| 2001/0015812 A1 | 8/2001 | Sugaya |
| 2002/0010783 A1 | 1/2002 | Primak et al. |
| 2002/0091831 A1 | 7/2002 | Johnson |
| 2002/0124089 A1 | 9/2002 | Aiken, Jr. et al. |
| 2002/0133491 A1 | 9/2002 | Sim et al. |
| 2002/0141448 A1 | 10/2002 | Matsunaga |
| 2002/0143953 A1 | 10/2002 | Aiken |
| 2002/0143954 A1 | 10/2002 | Aiken, Jr. et al. |
| 2002/0166080 A1 | 11/2002 | Attanasio et al. |
| 2002/0178265 A1 | 11/2002 | Aiken, Jr. et al. |
| 2002/0178268 A1 | 11/2002 | Aiken, Jr. et al. |
| 2002/0191575 A1 | 12/2002 | Kalavade et al. |
| 2002/0194335 A1 | 12/2002 | Maynard |
| 2002/0199000 A1 | 12/2002 | Banerjee |
| 2003/0023711 A1 | 1/2003 | Parmar et al. |
| 2003/0023873 A1 | 1/2003 | Ben-Itzhak |
| 2003/0031180 A1 | 2/2003 | Datta et al. |
| 2003/0035420 A1 | 2/2003 | Niu |
| 2003/0061402 A1 | 3/2003 | Yadav |
| 2003/0079146 A1 | 4/2003 | Burstein |
| 2003/0081624 A1 | 5/2003 | Aggarwal et al. |
| 2003/0131245 A1 | 7/2003 | Linderman |
| 2003/0152078 A1 | 8/2003 | Henderson et al. |
| 2003/0202536 A1 | 10/2003 | Foster et al. |
| 2004/0001497 A1 | 1/2004 | Sharma |
| 2004/0128312 A1 | 7/2004 | Shalabi et al. |
| 2004/0139057 A1 | 7/2004 | Hirata et al. |
| 2004/0139108 A1 | 7/2004 | Tang et al. |
| 2004/0141005 A1 | 7/2004 | Banatwala et al. |
| 2004/0143599 A1 | 7/2004 | Shalabi et al. |
| 2004/0184442 A1 | 9/2004 | Jones et al. |
| 2004/0210623 A1 | 10/2004 | Hydrie et al. |
| 2004/0253956 A1* | 12/2004 | Collins .............. H04W 24/02 455/445 |
| 2005/0009520 A1 | 1/2005 | Herrero et al. |
| 2005/0021949 A1 | 1/2005 | Izawa et al. |
| 2005/0125276 A1 | 6/2005 | Rusu |
| 2005/0141506 A1 | 6/2005 | Aiken, Jr. et al. |
| 2005/0249225 A1 | 11/2005 | Singhal |
| 2005/0259586 A1 | 11/2005 | Hafid et al. |
| 2006/0036733 A1 | 2/2006 | Fujimoto et al. |
| 2006/0064478 A1 | 3/2006 | Sirkin |
| 2006/0069804 A1 | 3/2006 | Miyake et al. |
| 2006/0077926 A1 | 4/2006 | Rune |
| 2006/0092950 A1 | 5/2006 | Arregoces et al. |
| 2006/0098645 A1 | 5/2006 | Walkin |
| 2006/0112170 A1 | 5/2006 | Sirkin |
| 2006/0190997 A1 | 8/2006 | Mahajani et al. |
| 2006/0209789 A1 | 9/2006 | Gupta et al. |
| 2006/0230129 A1 | 10/2006 | Swami et al. |
| 2007/0086382 A1 | 4/2007 | Narayanan et al. |
| 2007/0094396 A1 | 4/2007 | Takano et al. |
| 2007/0118881 A1 | 5/2007 | Mitchell et al. |
| 2007/0156919 A1 | 7/2007 | Potti et al. |
| 2007/0165622 A1 | 7/2007 | O'Rourke et al. |
| 2007/0259673 A1 | 11/2007 | Willars et al. |
| 2007/0274285 A1 | 11/2007 | Werber et al. |
| 2007/0286077 A1 | 12/2007 | Wu |
| 2007/0288247 A1 | 12/2007 | Mackay |
| 2007/0294209 A1 | 12/2007 | Strub et al. |
| 2008/0109870 A1 | 5/2008 | Sherlock et al. |
| 2008/0134332 A1 | 6/2008 | Keohane et al. |
| 2008/0162679 A1 | 7/2008 | Maher et al. |
| 2008/0263209 A1 | 10/2008 | Pisharody et al. |
| 2008/0271130 A1 | 10/2008 | Ramamoorthy |
| 2008/0320151 A1 | 12/2008 | McCanne et al. |
| 2009/0037361 A1* | 2/2009 | Prathaban ............ G06F 17/3089 706/47 |
| 2009/0106830 A1 | 4/2009 | Maher |
| 2009/0141634 A1 | 6/2009 | Rothstein et al. |
| 2009/0213858 A1 | 8/2009 | Dolganow et al. |
| 2009/0262741 A1 | 10/2009 | Jungck et al. |
| 2009/0271472 A1 | 10/2009 | Scheifler et al. |
| 2009/0313379 A1 | 12/2009 | Rydnell et al. |
| 2010/0162378 A1 | 6/2010 | Jayawardena et al. |
| 2010/0188975 A1* | 7/2010 | Raleigh ............ G06Q 10/06375 370/230.1 |
| 2010/0235880 A1 | 9/2010 | Chen et al. |
| 2010/0312740 A1 | 12/2010 | Clemm et al. |
| 2011/0013525 A1 | 1/2011 | Breslau et al. |
| 2011/0064083 A1 | 3/2011 | Borkenhagen et al. |
| 2011/0099403 A1 | 4/2011 | Miyata et al. |
| 2011/0110294 A1 | 5/2011 | Valluri et al. |
| 2011/0153834 A1 | 6/2011 | Bharrat |
| 2011/0185073 A1 | 7/2011 | Jagadeeswaran et al. |
| 2011/0276695 A1 | 11/2011 | Maldaner |
| 2011/0292939 A1 | 12/2011 | Subramaian et al. |
| 2012/0023231 A1 | 1/2012 | Ueno |
| 2012/0066371 A1 | 3/2012 | Patel et al. |
| 2012/0084460 A1 | 4/2012 | McGinnity et al. |
| 2012/0117571 A1 | 5/2012 | Davis et al. |
| 2012/0144014 A1 | 6/2012 | Natham et al. |
| 2012/0151353 A1 | 6/2012 | Joanny |
| 2012/0155495 A1 | 6/2012 | Clee et al. |
| 2012/0239792 A1 | 9/2012 | Banerjee et al. |
| 2012/0240185 A1 | 9/2012 | Kapoor et al. |
| 2013/0007225 A1 | 1/2013 | Gage et al. |
| 2013/0074177 A1 | 3/2013 | Varadhan et al. |
| 2013/0083725 A1 | 4/2013 | Mallya et al. |
| 2013/0089099 A1 | 4/2013 | Pollock et al. |
| 2013/0091273 A1 | 4/2013 | Ly et al. |
| 2013/0148500 A1 | 6/2013 | Sonoda et al. |
| 2013/0166731 A1* | 6/2013 | Yamanaka .......... H04L 41/5067 709/224 |
| 2013/0191548 A1 | 7/2013 | Boddukuri et al. |
| 2013/0262702 A1 | 10/2013 | Davis |
| 2013/0282791 A1 | 10/2013 | Kruglick |
| 2013/0311686 A1 | 11/2013 | Fetterman et al. |
| 2014/0047115 A1* | 2/2014 | Lipscomb ............ G06F 9/485 709/226 |
| 2014/0164617 A1 | 6/2014 | Jalan et al. |
| 2014/0258465 A1 | 9/2014 | Li |
| 2014/0258536 A1 | 9/2014 | Chiong |
| 2014/0269728 A1 | 9/2014 | Jalan et al. |
| 2014/0330982 A1 | 11/2014 | Jalan et al. |
| 2014/0334485 A1 | 11/2014 | Jain et al. |
| 2014/0379901 A1* | 12/2014 | Tseitlin ................ H04L 43/08 709/224 |
| 2015/0085650 A1* | 3/2015 | Cui ...................... H04W 92/02 370/230 |
| 2015/0215436 A1 | 7/2015 | Kancherla |
| 2015/0281087 A1 | 10/2015 | Jalan et al. |
| 2015/0350383 A1 | 12/2015 | Davis |
| 2015/0381465 A1* | 12/2015 | Narayanan ............ H04L 43/062 709/224 |
| 2016/0036778 A1 | 2/2016 | Chen et al. |
| 2016/0050233 A1 | 2/2016 | Chen et al. |
| 2016/0105395 A1 | 4/2016 | Chen et al. |
| 2016/0105446 A1 | 4/2016 | Chen et al. |
| 2016/0112497 A1* | 4/2016 | Koushik ................ H04L 67/10 726/7 |
| 2016/0119382 A1 | 4/2016 | Chen et al. |
| 2016/0173579 A1 | 6/2016 | Jalan et al. |
| 2016/0261642 A1 | 9/2016 | Chen et al. |
| 2017/0041350 A1 | 2/2017 | Chen et al. |

FOREIGN PATENT DOCUMENTS

| | | |
|---|---|---|
| CN | 101567818 A | 10/2009 |
| CN | 102104548 A | 6/2011 |
| CN | 102918801 A | 2/2013 |
| CN | 103365654 A | 10/2013 |
| CN | 102918801 B | 5/2016 |
| EP | 0648038 A2 | 4/1995 |

(56) References Cited

FOREIGN PATENT DOCUMENTS

| | | | |
|---|---|---|---|
| EP | 1770915 A1 | 4/2007 |
| EP | 1885096 A1 | 2/2008 |
| EP | 2577910 A2 | 4/2013 |
| HK | 1183569 A | 12/2013 |
| HK | 1188498 A | 5/2014 |
| JP | 2001298449 A | 10/2001 |
| JP | 2013528330 A | 7/2013 |
| JP | 5946189 B2 | 7/2016 |
| WO | WO2011149796 A2 | 12/2011 |
| WO | WO2014088741 A1 | 6/2014 |
| WO | WO2014144837 A1 | 9/2014 |
| WO | WO2014179753 A2 | 11/2014 |

OTHER PUBLICATIONS

Samar, V., "Single Sign-On Using Cookies for Web Applications," IEEE 8th International Workshop, 1999, pp. 158-163.

"Allot Announces the General Availability of its Directory Services-Based NetPolicy™ Manager," Allot Communications, Tel Aviv, Israel, Feb. 28, 2000, 2 pages.

"Allot Communications Announces Business-Aware Network Policy Manager," Allot Communications, Sophia Antipolis, France, Sep. 20, 1999, 2 pages.

"Allot Communications Announces Directory Services Based Network Policy Manager," Allot Communications, Los Gatos, California, Apr. 5, 1999, 2 pages.

"Allot Communications Announces the Netenforcer Family of IP Traffic Management Products: Fault-Tolerant, Scaleable, Policy-Based Bandwidth Management, QOS, SLA Solutions," Allot Communications, Burlingame, California, Dec. 13, 1999, 2 pages.

"Allot Communications Launches NetEnforcer with NetWizard, the Fastest Way to Implement Accurate and Reliable Network QoS Policies," Allot Communications, Burlingame, California, Jan. 25, 2001, 2 pages.

"Allot Introduces Turnkey Next Generation IP Service and Creation Solution—the Virtual Bandwidth Manager," Allot Communications, Atlanta, Georgia, SUPERCOMM 2000, Booth #8458, Jun. 5, 2000, 2 pages.

"Data Communications Awards Allot Communications 'Hot Product' in Internetworking/IP Tools Category," Allot Communications, Los Gatos, California, Jan. 18, 1999, 2 pages.

"Policy-Based Network Architecture," Allot Communications, 2001, 12 pages.

Dahlin, A. et al, "EDDIE A Robust and Scalable Internet Server," Ericsson Telecom AB, Stockholm, Sweden, pp. 1-7 (May 1998). Copy unavailable.

Aron, Mohit et al., "Efficient Support for P-HTTP in Cluster-Based Web Servers," Proceedings of 1999 Annual Usenix Technical Conference, Monterey, California, Jun. 1999, 14 pages.

Aron, Mohit et al., "Scalable Content-aware Request Distribution in Cluster-based Network Servers," Proceedings of the 2000 Annual Usenix Technical Conference, San Diego, California, Jun. 2000, 15 pages.

Aron, Mohit, "Scalable Content-aware Request Distribution in Cluster-based Network Servers," Department of Computer Science, Rice University [Online, retrieved on Mar. 13, 2001], Retreived from the Internet: <URL:http://softlib.rice.edu/softlib/scalableRD.html>, 8 pages.

"ACEdirector™: 8-Port 10/100 MBPS Ethernet Switch," Alteon WebSystems, San Jose, California (1999), 2 pages.

"Enhancing Web User Experience with Global Server Load Balancing," Alteon WebSystems, San Jose, California, Jun. 1999, 8 pages.

"The Next Step in Server Load Balancing," Alteon WebSystems, San Jose, California, Nov. 1999, 16 pages.

"1.3.1.2.5 Virtual IP Addressing (VIPA)," excerpt from "IP Configuration" [online], IBM Corporation, 1998 [retreived on Sep. 8, 1999], retrieved from the Internet: <http://w3.enterlib.ibm.com:80/cgi-bin/bookmgr/books/F1AF7001/1.3.1.2>, 4 pages.

"1.3.20 Device and Link Statement—Virtual Devices (VIPA)," excerpt from "IP Configuration" [online], IBM Corporation, 1998 [retrieved on Sep. 8, 1999], retrieved from the Internet: <URL:http://w3.enterlib.ibm.com:80/cgi-bin/bookmgr/books/F1AF7001/1.3.2>, 3 pages.

"1.3.23 Home Statement," excerpt from "IP Configuration" [online], IBM Corporation, 1998 [retrieved on Sep. 8, 1999], retrieved from the Internet: <URL:http://w3.enterlib.ibm.com:80/cgi-bin/bookmgr/books/F1AF7001/1.3.2>, 6 pages.

Devine, Mac, "TCP/IP Application Availability and Workload Balancing in the Parallel Sysplex," SHARE Technical Conference, Aug. 22-27, 1999, 17 pages.

Pai, Vivek S. et al., "Locality-Aware Request Distribution in Cluster-based Network Servers," Proceedings of the 8th International Conference on Architectural Support for Programming Languages and Operating Systems (ASPLOS VIII), San Jose, CA, Oct. 1998, 12 pages.

Apostolopoulos, G. et al., "Design, Implementation and Performance of a Content-Based Switch," INFOCOM 2000, Nineteenth Annual Joint Conference of the IEEE Computer and Communication Societies, IEEE, Mar. 2000, pp. 1117-1126, vol. 3.

* cited by examiner

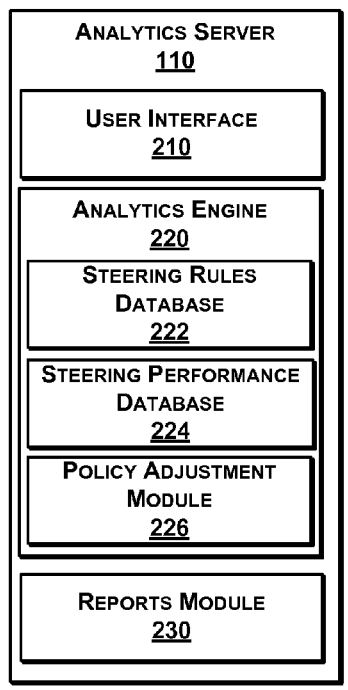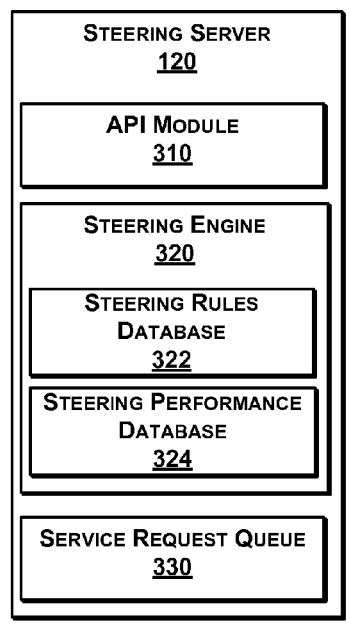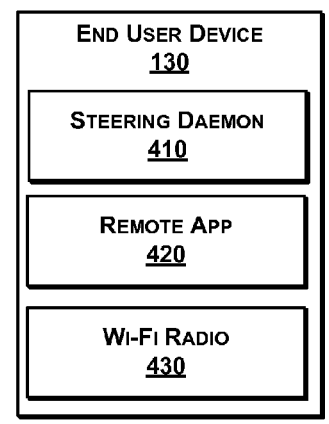
*FIG. 2*     *FIG. 3*     *FIG. 4*

POLICY-DRIVEN MANAGEMENT OF APPLICATION TRAFFIC FOR PROVIDING SERVICES TO CLOUD-BASED APPLICATIONS

FIELD OF THE INVENTION

The invention relates generally to computer networking, and more specifically, to policy-driven steering/management of network traffic to replicated deployments, which may differ in some specific feature such as software version numbers, to cloud-based applications or remotely executed applications for providing application services such as automated version updates, feature evaluation etc.

BACKGROUND

Remote applications are accessed by users of an end device through a network. The application can be executed remotely, or be downloaded for local execution (e.g., using Java or Citrix). During upgrades of codets in remote applications using a continuous deployment model, it is common to have a production environment with a current version of the application code (e.g., a blue environment), and a separate production environment with an updated version of the application code (e.g., a green environment). The typical process is to fully deploy a well-tested new version of code but if problems ensue the code is rolled back to a previous version. A more prudent approach is to divert a small or non-critical production traffic from the default blue environment to the green environment in order to update and verify the new codet. A small percentage of traffic can be sent to the green environment and, based on the updated results, and more or less of production traffic can be sent in a sequence of phases. Once the codet is verified to satisfaction, all application traffic can be steered to the green environment and the blue environment can be retired.

Current approaches for traffic steering or splitting between blue and green environments are performed manipulating DNS end points of an application. This approach is done by configuring the application server IP addresses for both blue and green environment in the DNS entry, and then controlling the number of application server entries to steer/split the traffic proportionally between the two environments.

While this approach will split between the environments, it is very difficult to control the percentage of traffic that is split, or to split the traffic based on some application related conditions, or based on some user or user device conditions. Typically, conditions are based on some attributes of the application traffic. When the application traffic uses HTTP or HTTPS (SSL) as the transport, the HTTP header values can be used for the conditions. However, today, there is no service or product that is readily available to conditionally split traffic based on HTTP header values between completely different application environments.

Furthermore, it is difficult to ascertain performance or functional correctness of a split for verification. After tedious configuration changes to split or steer traffic between different application environments, understanding the effect of the application changes by comparing various performance and functional metrics involves manually reviewing multiple metrics dashboards and log files.

What is needed is a robust technique to improve traffic steering to a second environment. Further, improved feedback of performance and functionality at different splits is desired.

SUMMARY

The above-mentioned shortcomings are addressed by methods, computer program products, and systems for policy-driven management of application traffic for providing services to cloud-based applications.

In one embodiment, a steering policy comprising a set of rules is generated for a deployment from a current code environment to an updated code environment. The steering policy can guide steering decisions between the current and updated code environments. Generally, traffic steering or management refers to dropping, mirror, redirecting, splitting and rate limiting between replicated application deployments of traffic based on rules. Traffic rules can split traffic based on a logical expression of domain, path and headers of an HTTP request, for example. Other embodiments also steer based on smartflows, which further group traffic flows directed to a specific compute resources that may require specific services to be applied on them, such as specific policies to be differentially applied to these traffic flows for the purpose of securing them, collecting metrics and statistics measuring effectiveness of alternative implementations, etc, Code environments tend to be replica of each other differing in some key attributes such as software version, alternative implementation of features, or between a production and staging or test deployment.

In an embodiment, the steering policy is sent to a steering server. The steering server uses the steering policy to make decisions about whether to send service requests to the current code environment or the updated code environment. Feedback concerning actual steering decisions made by the steering server is received (e.g., performance metrics). The steering policy is automatically adjusted in response to the feedback.

Advantageously, deployments of new versions of remotely executing software are improved, among other improvements.

BRIEF DESCRIPTION OF THE DRAWINGS

In the following drawings, like reference numbers are used to refer to like elements. Although the following figures depict various examples of the invention, the invention is not limited to the examples depicted in the figures.

FIG. 2 is a more detailed block diagram illustrating an analytics server of the system in FIG. 1, according to an embodiment.

FIG. 3 is a more detailed block diagram illustrating a steering server of the system in FIG. 1, according to an embodiment.

FIG. 4 is a more detailed block diagram illustrating an end user device of the system in FIG. 1, according to an embodiment.

DETAILED DESCRIPTION

In the following disclosure, methods, computer program products, and systems for policy-driven management of application traffic for providing services to cloud-based applications are described. Generally, users are steered to either a current version of applications to an updated version of those applications, during a period or deployment.

Systems for Policy-Driven Application Traffic Management (FIGS. 1 to 5)

Figure 1:
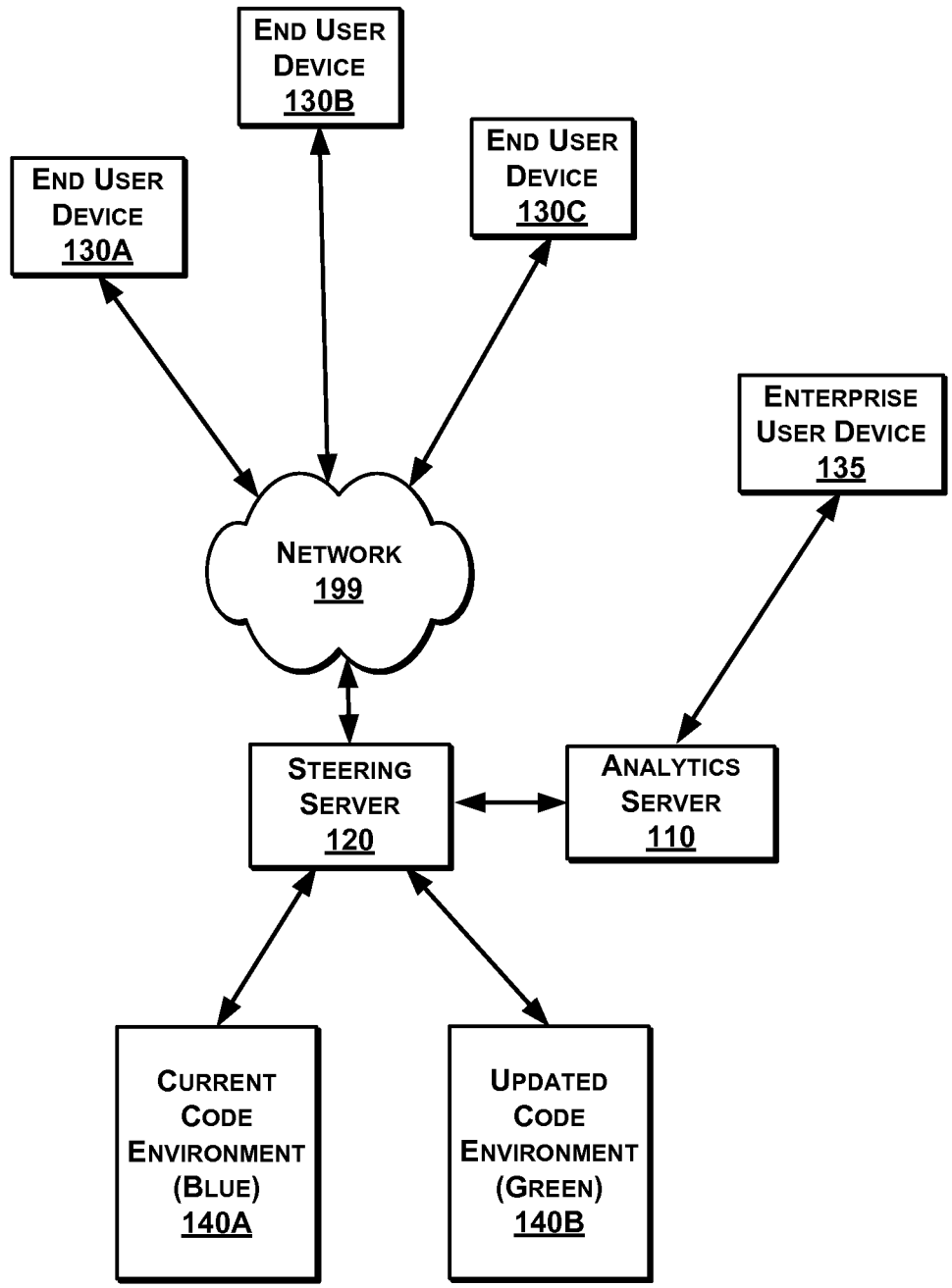
FIG. 1 is a high-level block diagram illustrating a system for policy-driven management of application traffic for providing services to cloud-based applications, according to an embodiment.

FIG. 1 is a high-level block diagram illustrating a system 100 for policy-driven management of application traffic for providing services to cloud-based applications, according to an embodiment. The system 100 comprises an analytics server 110 and a steering server 120 connected through a network 199 to end user devices 130A-C and current code environment (blue) 140A and updated code environment (green) 140B. Generally, the analytics server 110 employs the steering server 120 to gradually steer traffic from the current environment 140A to the updated environment 140B, while gathering analytics for automatic adjustments and reporting to an enterprise user device 135 (e.g., development operator or a network administrator). Policy-driven application traffic management can be provided as a service for green deployments by clients. For example, an Amazon or Google data center hosting client web sites can provide improved transitions to from blue to green environments.

The network architecture of the system 100 includes the analytics server 110 coupled to the steering server 120 either directly, as showing, or indirectly through the network 199, as in other embodiments. Similarly, the blue and green environments 140A,B can be located within a LAN along with the steering server 120, as shown, or indirectly through the network 199, in other embodiments. The end user devices 130A-C and the enterprise user device 135 can access components through the network 199, via wired or wireless connections. The enterprise user device 135 can also be a network administrator that connects directly to the analytics server or the steering server 120 to make command line adjustments through a wired or wireless connection. Generally, connections can be wired (e.g., Ethernet, serial port, power lines, analog telephone lines), wireless (Wi-Fi, 3G/4G, Bluetooth), or a combination of both. Other network architectures are possible with additional network components such as access points, routers, Wi-Fi or SDN (software defined networking) controllers, firewalls, gateways, and the like.

The analytics server 110 provides control and feedback to a user of the system 100 during deployment of updated code for cloud-based applications. The analytics server 110 can include a user interface for access through the Internet, USB connection, mobile app, or the like. A configuration engine, in some instances, saves creates a user profile in order to like the analytics server 110 to a particular cloud-based application with log-in credentials, IP addresses, end point or destination LAN information, or the like, and also information for creating a policy for traffic steering between the current and updated environments 140A,B. The policy can describe a profile of desired traffic to be sent to either environment and be based on a variety of parameters, such as end user device type, time of day, wireless or mobile requests, type of application, user history, application conditions or traffic conditions, just to illustrate a few examples. The analytics server 110 outputs configuration information to the steering server 120 in order to implement policies.

The analytics server 110 receives feedback from the steering server 120 and highlights specific metrics based on policies. For example, a performance score and/or a functional score that summarizes the success of the updated environment 140B at the current traffic split. In another example, very detailed metrics about different types of user devices 130A-C, application response times, amount of errors, processor usage, bandwidth usage, memory usage, or the like are provided, in the form of a matrix.

Responsive to real-time performance metrics, in one embodiment, the analytics engine 110 can automatically adjust the steering policies. If a current stage of deployment is successful, the analytic server 110 can more fully activate the updated environment 140B. Some embodiments automatically adjust ratios based on preconfigured thresholds of performance.

The analytics server 110 can comprise a server blade, a personal computer (PC), a virtualized cloud-based service device, or any other appropriate processor-based device. In some embodiments, the analytics server 110 is operated by a service provider, such as a data center providing virtual hosting services for the cloud-based applications. In other embodiments, the analytics server 110 is self-implemented by an application developer that purchases and owns a software product.

More detailed examples of the steering server 120 are described below with respect to FIG. 4.

The steering server 120 implements policies of the analytics server 110 to selectively steer network traffic for a cloud-based application between the current and the updated cpde environments 140A,B. In more liberal implementations, a mere ratio of traffic splitting is provided by policies, leaving a large amount of selection discretion to the steering server 120. In more granular implementations, a strict demographic of traffic diversity provides more direction to the steering server 120. In one instance, a certain percentage of mobile traffic or guest log-ins is sent to the updated code environment 140B. Other instances, percentages are based on real-time application conditions, performance, or error rates. Even if actual incoming traffic loads deviate from predicted or desired traffic loads, the steering server 120 has the capability of discriminating actual traffic loads to produce desired traffic loads on either environment.

In one embodiment, the steering server 120 automatically implements steering policy adjustments. The policy adjustments can be immediately implemented, or current sessions can be completed and subsequent sessions are adjusted. In some situations, existing user devices continue with earlier steering policies while new user devices are treated under updated steering policies.

The steering server 120 can comprise any of the devices described in relation to the analytics server 110. In one embodiment, the steering server 120 is physically integrated with the analytics engine and operated by a common entity (e.g., commonly operated by a data center, or commonly manufactured by a vendor). In another embodiment, the steering server 120 is manufactured by a first vendor and hosted by a first entity, and the analytics server 110 is manufactured by a second vendor and is hosted by a second entity.

Generally, the steering policy can guide steering decisions between the current and updated code environments. Traffic steering or management refers to dropping, mirror, redirecting, splitting and rate limiting between replicated application deployments of traffic based on rules. Traffic rules can split traffic based on a logical expression of domain, path and headers of an HTTP request, for example. Other embodiments also steer based on smartflows, which further group traffic flows directed to a specific compute resources that may require specific services to be applied on them, such as specific policies to be differentially applied to these traffic flows for the purpose of securing them, collecting metrics and statistics measuring effectiveness of alternative implementations, etc.

More detailed examples of the steering server 120 are described below with respect to FIG. 3.

The user devices 130A-C and the current and updated environments 140A,B can comprise any of the processor-based devices described herein. The user devices 130A-C can have human or machine users that access cloud-based applications, for example, through a smart phone, laptop, tablet, phablet or personal computer, or java or web interface. Execution can occur completely in the cloud, completely on the user devices 130A-C, or in cooperation. In some cases, a user device 130A-C is profiled by the system 100 in order to meet traffic diversity requirements of a policy. The environments 140A,B can comprise, for example, a subset of a data center, an individual server, or a virtualized group of network locations, for example. The current and updated types of environments are mere illustrations as any type of first and second environments can be implemented for various purposes in continuous deployment (e.g., legacy and testing environments).

More detailed examples of the steering server 120 are described below with respect to FIG. 5.

The current and updated code environments 140A,B can store and execute cloud-based applications. Code environments tend to be replica of each other differing in some key attributes such as software version, alternative implementation of features, or between a production and staging or test deployment. In one case, only one application provided by a single entity resides on an environment. In another case, many different applications provided by many different entities resides on an environment. The current and updated code environments 140A,B can be physically located on different servers or virtual servers, or alternatively, be located on a single device.

FIG. 2 is a more detailed block diagram illustrating the analytics server 110 of the system in FIG. 1, according to an embodiment. The analytics server 110 comprises a user interface 210, an analytics engine 220, and reports module 230.

The user interface 210 allows the enterprise user device 135 access to the analytics server 110 for configuring deployments and for making deployment adjustments. User accounts are established to secure and customize implementations. Preferences can be entered by checkboxes or responsive to a script of questions presented to an admin, and be converted to specific steering rules.

The analytics engine 220 automatically implements steering policies at the steering server 120. A steering rules database 222 stores steering rules for deployments and download to the steering server 120. The steering performance database 224 downloads performance metrics from the steering server 110 based on actual steering decisions. Further analytics can be performed, for example, by aggregating deployment metrics for several applications or several different clients. A policy adjustment module 226 can implement deployment adjustments responsive to analytics. In some embodiments, adjustments are automatically completed using customer steering rules or general business processes. In other embodiments, adjustments are manually entered by the enterprise user device 135.

The reports module 230 can present various views of analytic data on-demand to an enterprise server device 135. Additionally, reports can be periodically generated. Moreover, alarms can be raised based on a current deployment situation such as a server failure.

FIG. 3 is a more detailed block diagram illustrating the steering server 120 of the system in FIG. 1, according to an embodiment. The steering server 120 includes an API (application programming interface) module 310, a steering engine 320, and a service request queue 330.

The API module 310 provides an I/O interface for the analytics server 110 and the end user device 130. The analytics server 110 sends commands and data the steering engine 320 to affect steering policy, and the steering server sends data back to the analytics server 110. Separately, service requests are received and stored into the service request queue 330.

In an embodiment, the steering engine 320 makes real-time decisions on whether to redirect requests for service to a blue or a green environment (or other related type of environment). A steering rules database 322 stores rules sent from the steering rules database 222. Metrics associated with environment performance are collected by a steering performance database 324.

The service request queue 330 stores service requests until redirected. There can be one queue or separate queues per client, per application, or per environment, for example.

FIG. 4 is a more detailed block diagram illustrating the end user device 130 (generically representing the end user devices 130A-C) of the system in FIG. 1, according to an embodiment. The end user device 130 comprises a steering daemon 410, a remote app 420 and a Wi-Fi radio 430.

The steering daemon 410 executes locally for communicating data back to the steering engine 320. General environmental characteristics can be sent, such as device type, operating system type and version, static and dynamic computing resources (e.g., memory and processor usage). Additional characteristics available concern execution feedback of the remote app 420b being routed to blue or green environments (e.g., service delays and application performance). The remote app 420 is a locally executed version of the service provided by blue or green environments. The Wi-Fi radio 430 is just one example of a communication module based on the device and network connection type.

Figure 5:
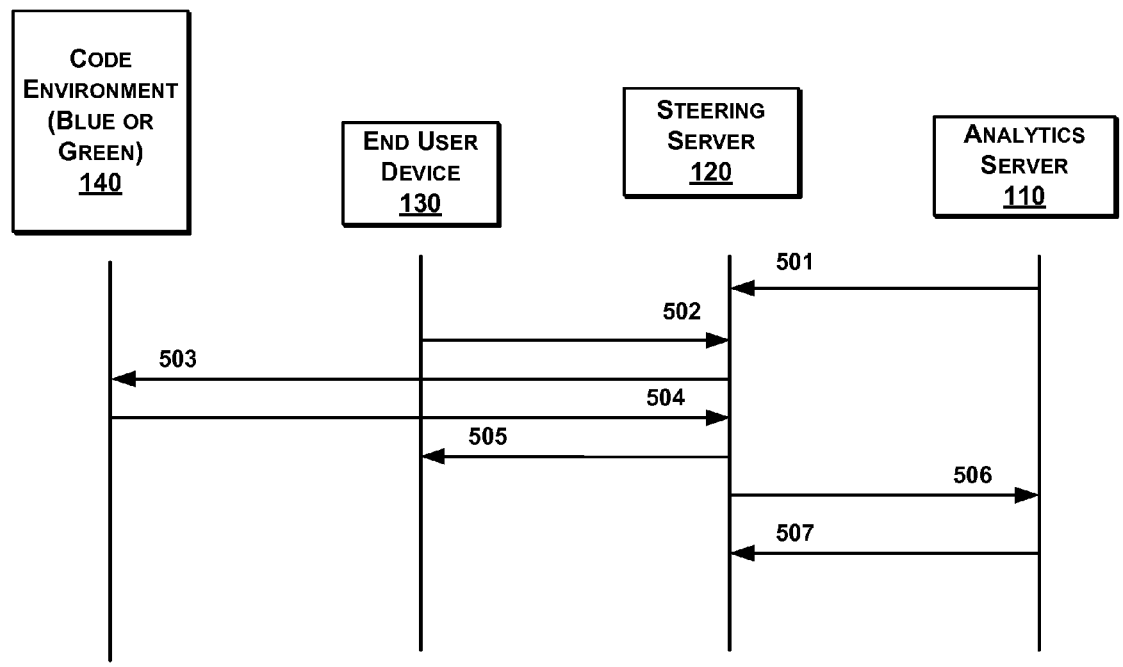
FIG. 5 is a sequence diagram illustrating interactions between components of FIG. 1, according to an embodiment.

FIG. 5 is a sequence diagram illustrating interactions 500 between components of FIG. 1, according to an embodiment.

Initially, the analytics server 110 sends policy steering rules to the steering server 120 to start a deployment (interaction 501). The end user device 502 sends a service request (interaction 502). The steering server 110 redirects service request to code environment 140, either blue or green (interaction 503), and awaits a response (interaction 504) for returning to the end user device 130 (interaction 505). Performance metrics are periodically sent from the steering server 120 back to the analytics server 110 (interaction 506). Based on analytics updated steering policies are sent (interaction 507).

Many variations are possible. The end user interactions 130 remain the same on the front end although environment selection on the back end can be handled differently at different times.

Figure 6:
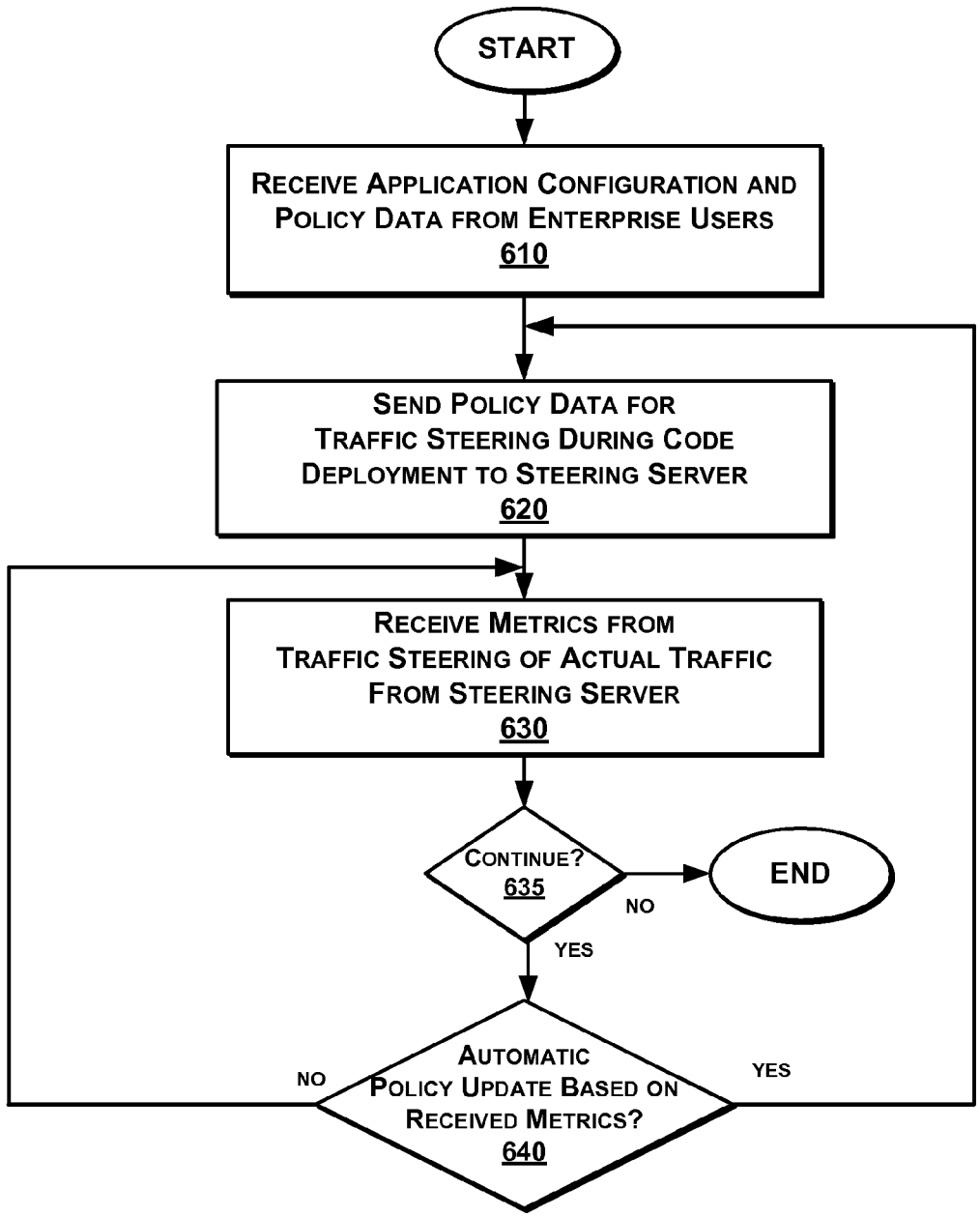
FIG. 6 is a high-level flow diagram illustrating a method for policy-driven management of application traffic for providing services to cloud-based applications, according to an embodiment.
Figure 7:
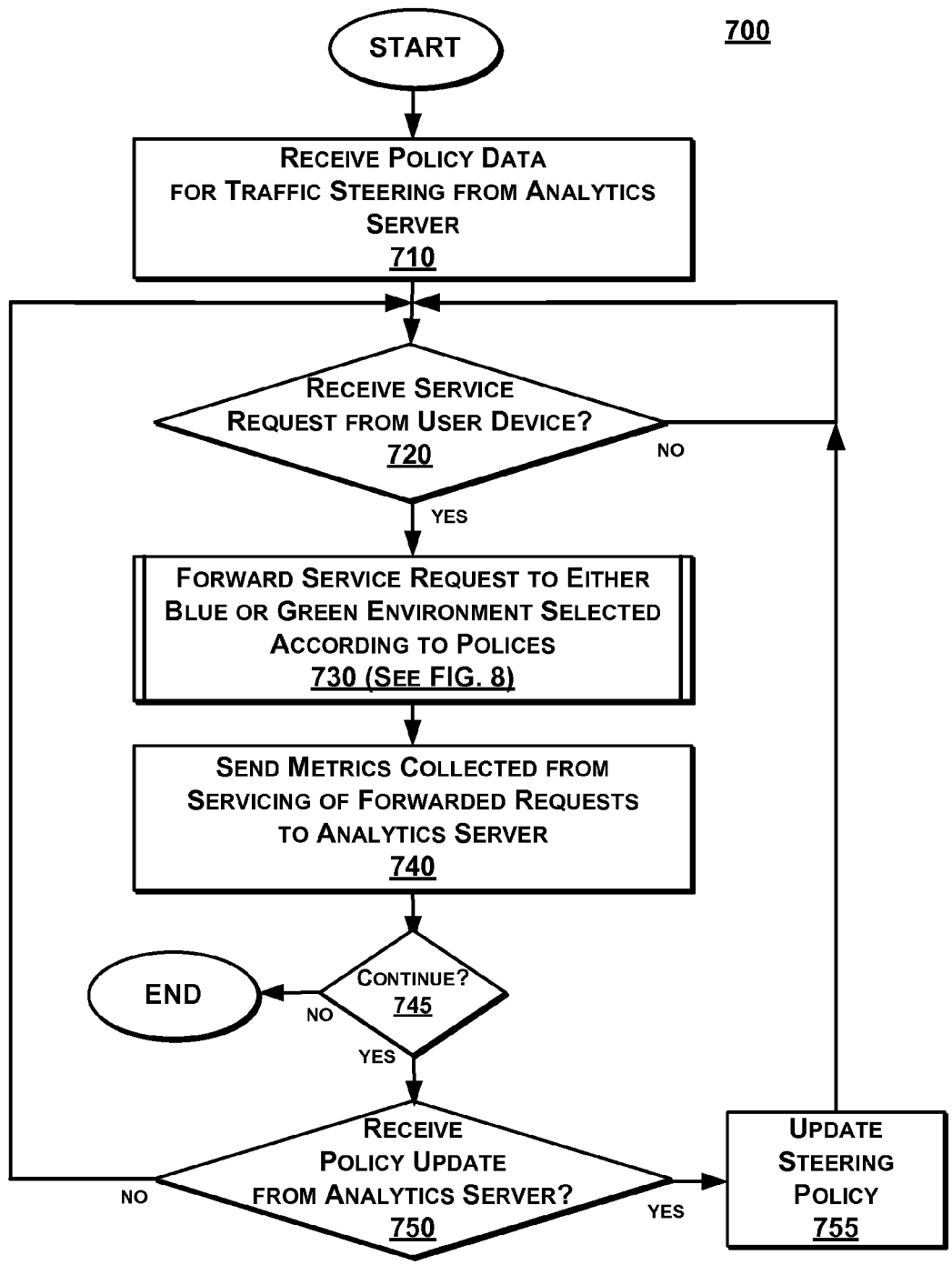
FIG. 7 is a high-level flow diagram illustrating a method for adjusting policy-driven management of traffic for providing services to cloud-based applications, according to one embodiment.
Figure 8:
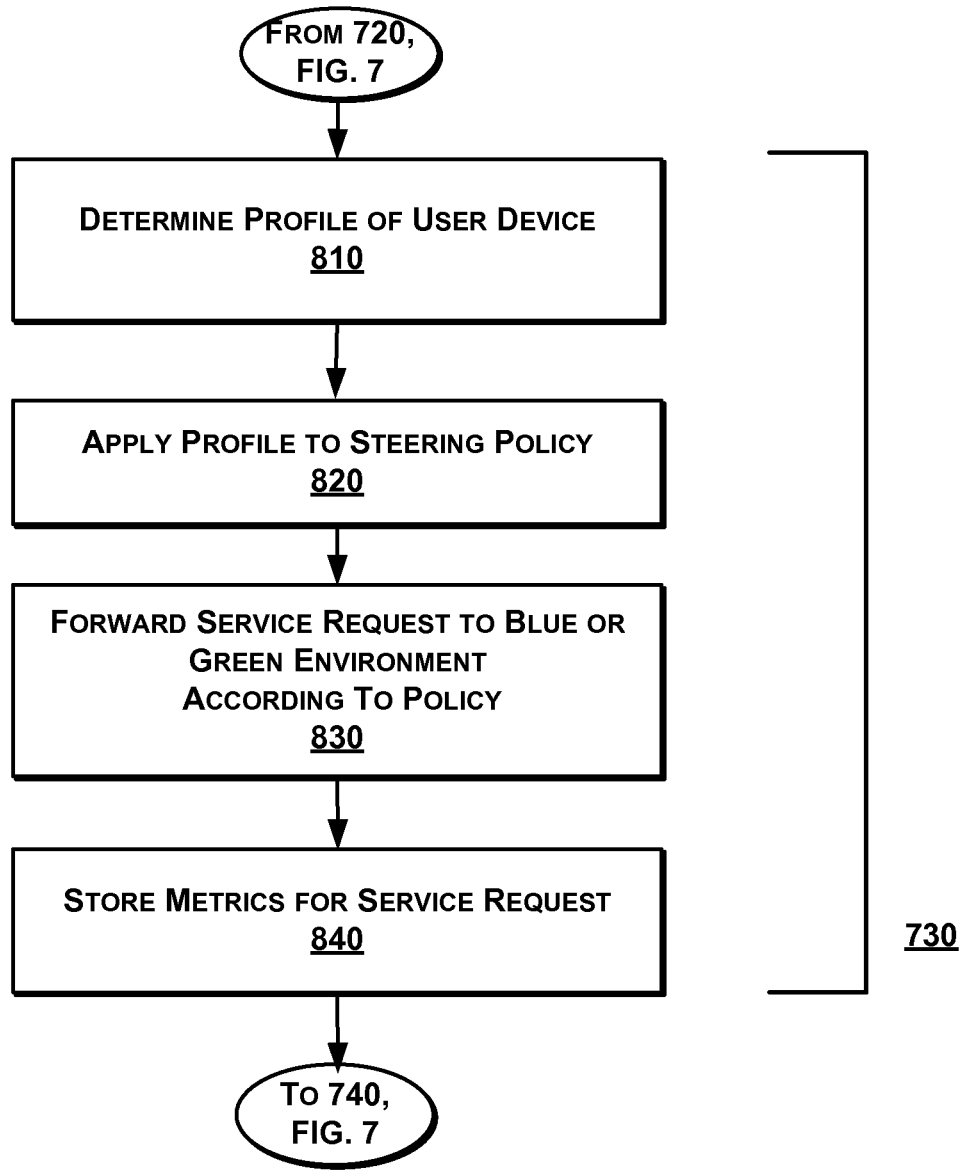
FIG. 8 is a more detailed flow diagram for a step of forwarding service request to either a blue or green environment selected according to steering policy, according to an embodiment.

Methods for Policy-Driven Application Traffic Management (FIGS. 6 to 8)

FIG. 6 is a high-level flow diagram illustrating a method 600 for policy-driven management of application traffic for providing services to cloud-based applications, according to an embodiment. The method 600 can be performed by an analytics component (e.g., the analytics server 110). Many different embodiments of the following methods are possible, such as more or fewer steps, steps occurring in different orders, and varied grouping of functionalities.

Application configuration and policy data is received from enterprise users (step 610). Policy data is sent to a steering server for traffic steering during code deployment (step 620). Metrics from traffic steering of actual traffic are received from the steering server (step 630). Based on the metrics, steering policies can be automatically updated at the steering server (steps 640, 641). Otherwise, metrics continue to be received even if no steering policies are adjusted (steps 640, 642).

FIG. 7 is a high-level flow diagram illustrating a method 700 for adjusting policy-driven management of traffic for providing services to cloud-based applications, according to one embodiment. The method 700 can be performed by an steering component (e.g., the steering server 120).

Policy data for traffic steering can be received from an analytics server (step 710). When service request are received from user devices (step 720), they are forwarded to either blue or green environments selected according to policies (step 730), as further described in FIG. 8. Metrics collected from servicing requests are sent to the analytics server (step 740). If, in response, a policy update is received from the analytics server (step 750), the steering policy is updated (step 755) before continuing to receive service requests. Otherwise, service requests continue to be handled under the existing policy.

FIG. 8 is a more detailed flow diagram for the step 730 of forwarding service request to either a blue or green environment selected according to steering policy, according to an embodiment.

A profile of a user device is determined by, for example, a daemon executing on a user device and communicating with a steering server (step 810). The profile is applies to a steering policy (step 820). As a result, service requests are forwarded to either blue or green environments according to the policy (step 830). Performance metrics for service requests are stored (step 840).

Figure 9:
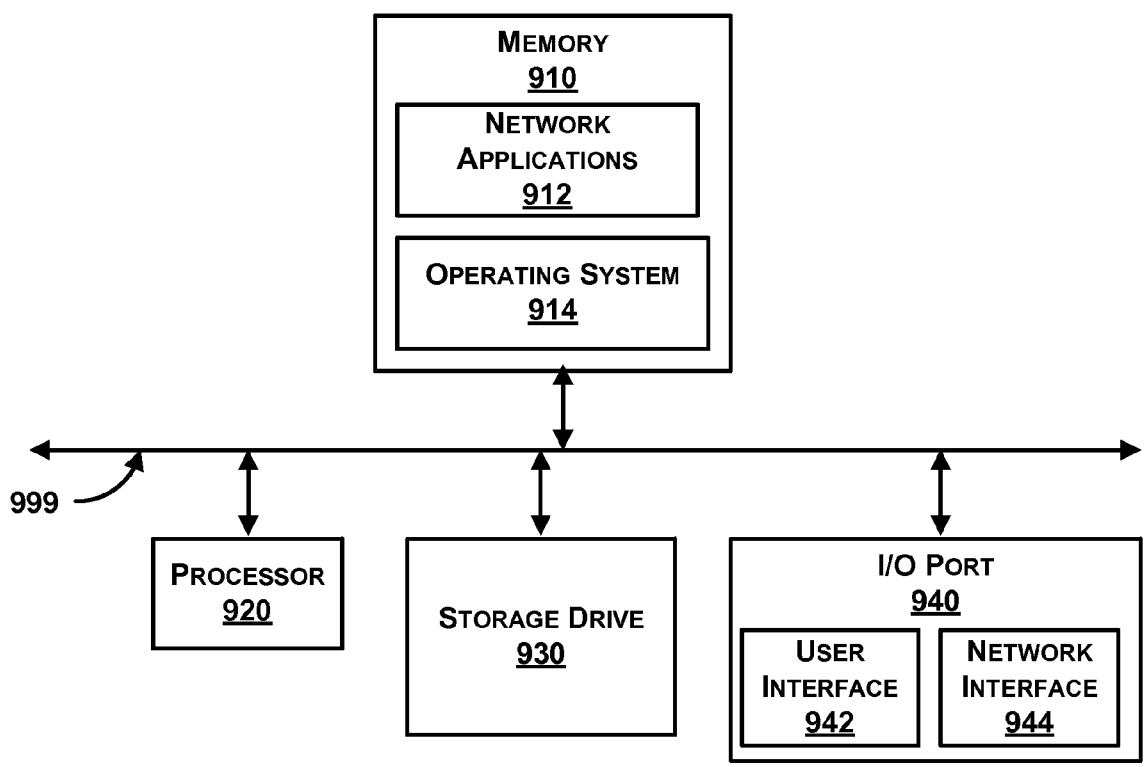
FIG. 9 is a block diagram illustrating an exemplary computing device, according to an embodiment.

General Computing Devices (FIG. 9)

FIG. 9 is a block diagram illustrating an exemplary computing device 900 for use in the system 100 of FIG. 1, according to one embodiment. The computing device 900 is an exemplary device that is implementable for each of the components of the system 100, including the analytics server 110, the steering server 120, the end user device 130, the enterprise user device 135 or the current or updated code environments 140A,B. The computing device 900 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 900, of the present embodiment, includes a memory 910, a processor 920, a storage drive 930, and an I/O port 940. Each of the components is coupled for electronic communication via a bus 999. Communication can be digital and/or analog, and use any suitable protocol.

The memory 910 further comprises network applications 912 and an operating system 914. The network applications 912 can include the modules of the analytics server 110, the steering server 120 and the end user device 130, as illustrated in FIGS. 2-4. Other network applications 912 can include a web browser, a mobile application, an application that uses networking, a remote application executing locally, a network protocol application, a network management application, a network routing application, or the like.

The operating system 914 can be one of the Microsoft Windows® family of operating systems (e.g., Windows 95, 98, Me, Windows NT, Windows 2000, Windows XP, Windows XP x64 Edition, Windows Vista, Windows CE, Windows Mobile, Windows 9 or Windows 8), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 920 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 920 can be single core, multiple core, or include more than one processing elements. The processor 920 can be disposed on silicon or any other suitable material. The processor 920 can receive and execute instructions and data stored in the memory 910 or the storage drive 930

The storage drive 930 can be any non-volatile type of storage such as a magnetic disc, EEPROM, Flash, or the like. The storage drive 930 stores code and data for applications.

The I/O port 940 further comprises a user interface 942 and a network interface 944. The user interface 942 can output to a display device and receive input from, for example, a keyboard. The network interface 944 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method for incremental transition between a current cloud-based code environment and an updated cloud-based code environment comprising:

receiving, by a steering server, from an analytics server, a steering policy comprising a first set of rules for steering less than a first percentage of first requests from the current cloud-based code environment to the updated cloud-based code environment;

sending, by the steering server, the less than the first percentage of the first requests to the updated cloud-based code environment using the steering policy, the less than the first percentage of the first requests being associated with first clients;

getting, by the steering server, from the updated cloud-based code environment and user devices of the first clients, metrics associated with the less than the first percentage of the first requests, the metrics including metrics associated with an operation of the updated cloud-based code environment and metrics communicated by the user devices of the first clients to the steering server, wherein the metrics associated with the operation of the updated cloud-based code environment include two or more of first updated cloud-based code environment response times, first updated cloud-based code environment errors, first updated cloud-based code environment processor usage, first updated cloud-based code environment memory usage, and first updated cloud-based code environment bandwidth usage, wherein the metrics communicated by the user devices of the first clients include at least dynamic computing resources associated with the user devices of the first clients, the dynamic computing resources associated with the user devices of the first clients including one or more of: a memory usage of the user devices of the first clients when processing sessions associated with the less than the first percentage of the first requests and a processor usage of the user devices of the first clients when processing the sessions associated with the less than the first percentage of the first requests;

computing, by the analytics server, a first performance score using the metrics;

receiving, by the steering server, from the analytics server, an updated steering policy when the first performance score fulfills a first predetermined criteria, the updated steering policy comprising a second set of rules for steering greater than the first percentage and less than a second percentage of the second service requests from the current cloud-based code environment to the updated cloud-based code environment;

sending, by the steering server, the greater than the first percentage and the less than the second percentage of the second service requests to the updated cloud-based code environment using the updated steering policy, the greater than the first percentage and less than the second percentage of the second service requests being associated with second clients;

getting, by the steering server, from the updated cloud-based code environment and user devices of the second clients, further metrics associated with the greater than the first percentage and less than the second percentage of the second service requests, the further metrics including metrics associated with a further operation of the updated cloud-based code environment and metrics communicated by the user devices of the second clients to the steering server, wherein the metrics associated with the further operation of the updated cloud-based code environment include two or more of: second updated cloud-based code environment response times, second updated cloud-based code environment errors, second updated cloud-based code environment processor usage, second updated cloud-based code environment memory usage, and second updated cloud-based code environment bandwidth usage, wherein the metrics communicated by the user devices of the second clients to the steering server include at least dynamic computing resources associated with the user devices of the second clients, the dynamic computing resources associated with the user devices of the second clients including one or more of: a memory usage of the user devices of the second clients when processing sessions associated with the greater than the first percentage and less than the second percentage of the second service requests and a processor usage of the user devices of the second clients when processing sessions associated with the greater than the first percentage and less than the second percentage of the second service requests;

computing, by the analytics server, a second performance score using the further metrics; and receiving, by the steering server, a further updated steering policy when the second performance score fulfills a second predetermined criteria, the further updated steering policy comprising a third set of rules for steering subsequent service requests from the current cloud-based code environment to the updated cloud-based code environment;

sending, by the steering server, subsequent service requests to the updated cloud-based code environment using the further updated steering policy.

2. The method of claim 1, wherein at least one of the first and second metrics comprises performance metrics.

3. The method of claim 1, wherein at least one of the first and second metrics comprises the duration of time between service requests and responses to service requests.

4. The method of claim 1, wherein at least one of the first and second metrics comprises application delay time experienced by an end user device, as reported by a daemon executing on the end user device to the steering server.

5. The method of claim 1, further comprising: receiving user input of preferences as a basis for at least one of the first and second set of rules.

6. The method of claim 1, further comprising: automatically adjusting at least one of the first and second steering policies in response to input from a network administrator.

7. The method of claim 1, further comprising:
receiving a fourth steering policy when the first performance score does not fulfill the first predetermined criteria, the fourth steering policy comprising a fourth set of rules for steering fourth service requests to the current cloud-based code environment;
sending fourth service requests to the current cloud-based code environment using the fourth steering policy.

8. The method of claim 1, further comprising:
sending less than the first percentage of fifth service requests to the updated cloud-based code environment using the further updated steering policy.

9. The method of claim 1, further comprising:
receiving specifications for a deployment from the current cloud-based code environment to the updated cloud-based code environment.

10. The method of claim 1, further comprising:
receiving specifications for a deployment from the current cloud-based code environment to the updated cloud-based code environment; and
automatically generating rules that implement the specifications for the deployment.

11. The method of claim 1, wherein the current cloud-based code environment implements a current version of a remotely hosted application and the updated cloud-based code environment implements an updated version of the remotely hosted application.

12. The method of claim 1, wherein the service requests are from end user devices and pertain to a plurality of different remotely hosted applications including the remotely hosted application.

13. The method of claim 1, wherein the service requests comprise variables submitted to the remotely hosted application, and sending responses to the service requests.

14. The method of claim 1, wherein at least one of the first and second steering policies comprises a type of device to send to the current cloud-based code environment and a type of device to send to the updated cloud-based code environment.

15. The method of claim 1, wherein at least one of the first and second steering policies comprises a characteristic of a user of the end user device to forward a service request to the current cloud-based code environment and a second characteristic of a user of the end user device to forward a second service request to the updated cloud-based code environment.

16. A non-transitory computer-readable storage medium having embodied thereon a program, the program being executable by a processor to perform a method for incremental transition between a current cloud based code environment and an updated cloud-based code environment comprising:
receiving, by a steering server, from an analytics server, a first steering policy comprising a first set of rules for steering less than a first percentage of first requests from the current cloud-based code environment to the updated cloud-based code environment;
sending, by the steering server, the less than the first percentage of the first requests to the updated cloud-based code environment using the first steering policy, the less than the first percentage of the first requests being associated with first clients;
getting, by the steering server, from the updated cloud-based code environment and user devices of the first clients, metrics associated with the less than the first percentage of the first requests, the metrics including metrics associated with an operation of the updated cloud-based code environment and metrics communicated by the user devices of the first clients to the steering server, wherein the metrics associated with the operation of the updated cloud-based code environment include two or more of first updated cloud-based code environment response times, first updated cloud-based code environment errors, first updated cloud-based code environment processor usage, first updated cloud-based code environment memory usage, and first updated cloud-based code environment bandwidth usage, wherein the metrics communicated by the user devices of the first clients include at least dynamic computing resources associated with the user devices of the first clients, the dynamic computing resources associated with the user devices of the first clients including one or more of: a memory usage of the user devices of the first clients when processing sessions associated with the less than the first percentage of the first requests and a processor usage of the user devices of the first clients when processing the sessions associated with the less than the first percentage of the first requests;
computing, by the analytics server, a first performance score using the metrics;
receiving, by the steering server, from the analytics server, an updated steering policy when the first performance score fulfills a first predetermined criteria, the updated steering policy comprising a second set of rules for steering greater than the first percentage and less than a second percentage of the second service requests from the current cloud-based code environment to the updated cloud-based code environment;
sending, by the steering server, the greater than the first percentage and the less than the second percentage of the second service requests to the updated cloud-based code environment using the updated steering policy, the greater than the first percentage and less than the second percentage of the second service requests being associated with second clients;
getting, by the steering server, from the updated cloud-based code environment and user devices of the second clients, further metrics associated with the greater than the first percentage and less than the second percentage of the second service requests, the further metrics including metrics associated with a further operation of the updated cloud-based code environment and metrics communicated by the user devices of the second clients to the steering server, wherein the metrics associated with the further operation of the updated cloud-based code environment include two or more of: second updated cloud-based code environment response times, second updated cloud-based code environment errors, second updated cloud-based code environment processor usage, second updated cloud-based code environment memory usage, and second updated cloud-based code environment bandwidth usage, wherein the metrics communicated by the user devices of the second clients to the steering server include at least dynamic computing resources associated with the user devices of the second clients, the dynamic computing resources associated with the user devices of the second clients including one or more of: a memory usage of the user devices of the second clients when processing sessions associated with the greater than the first percentage and less than the second percentage of the second service requests and a processor usage of the user devices of the second clients when processing sessions associated with the greater than the first percentage and less than the second percentage of the second service requests;

computing, by the analytics server, a second performance score using the further; and receiving, by the steering server, a further updated steering policy when the second performance score fulfills a second predetermined criteria, the further updated steering policy comprising a third set of rules for steering subsequent service requests from the current cloud-based code environment to the updated cloud-based code environment;

sending, by the steering server, subsequent service requests to the updated cloud-based code environment using the further updated steering policy.

\* \* \* \* \*